(12) United States Patent
Ikeda et al.

(10) Patent No.: US 11,145,436 B2
(45) Date of Patent: Oct. 12, 2021

(54) ASSEMBLED WIRE, METHOD OF MANUFACTURING ASSEMBLED WIRE AND SEGMENT COIL

(71) Applicant: ESSEX FURUKAWA MAGNET WIRE JAPAN COL, LTD., Tokyo (JP)

(72) Inventors: Keisuke Ikeda, Tokyo (JP); Keiichi Tomizawa, Tokyo (JP); Daisuke Muto, Tokyo (JP); Hideo Fukuda, Tokyo (JP)

(73) Assignee: ESSEX FURUKAWA MAGNET WIRE JAPAN COL, LTD., Tokyo (JP)

( * ) Notice: Subject to any disclaimer, the term of this patent is extended or adjusted under 35 U.S.C. 154(b) by 0 days.

(21) Appl. No.: 16/720,619

(22) Filed: Dec. 19, 2019

(65) Prior Publication Data
US 2020/0126688 A1    Apr. 23, 2020

Related U.S. Application Data

(63) Continuation of application No. PCT/JP2019/000629, filed on Jan. 11, 2019.

(30) Foreign Application Priority Data

Mar. 12, 2018    (JP) .............................. JP2018-044428

(51) Int. Cl.
*H01B 7/08*    (2006.01)
*H01B 7/28*    (2006.01)
(Continued)

(52) U.S. Cl.
CPC ........... *H01B 7/2813* (2013.01); *H01B 3/306* (2013.01); *H01B 3/307* (2013.01); *H01B 3/308* (2013.01);
(Continued)

(58) Field of Classification Search
CPC ........ H01B 3/306; H01B 3/307; H01B 3/308; H01B 7/2813; H01B 7/08; H01B 7/292; H05K 3/12; H05K 3/34; H05K 15/105
(Continued)

(56) References Cited

U.S. PATENT DOCUMENTS

| | | | | | |
|---|---|---|---|---|---|
| 3,842,192 | A | * | 10/1974 | Hilker | ..................... H01B 7/292 |
| | | | | | 174/120 SR |
| 2013/0014971 | A1 | * | 1/2013 | Muto | ..................... H01B 3/306 |
| | | | | | 174/110 SR |

(Continued)

FOREIGN PATENT DOCUMENTS

| CN | 106104708 A | 11/2016 |
|---|---|---|
| CN | 107004466 A | 8/2017 |

(Continued)

OTHER PUBLICATIONS

International Search Report issued in PCT Patent Application No. PCT/JP2019/000629 dated Mar. 26, 2019.
(Continued)

*Primary Examiner* — William H. Mayo, III
(74) *Attorney, Agent, or Firm* — Marshall, Gerstein & Borun LLP (57) ABSTRACT

An assembled wire has a substantially rectangular cross section, and is formed by assembling a plurality of strands. Each strand has a conductor portion and a strand insulating layer covering the conductor portion. At least a part of the assembled plurality of strands in the longitudinal direction is covered with an outer insulating layer. The strand is formed as follows. First, the strand insulating layer is coated on the outer periphery of the conductor portion. A large number of voids are formed in a resin constituting the strand insulating layer. From this state, the strand is formed, for example, by collapsing the strand insulating layer by heating and pressurizing. At this time, it is possible to uniformly collapse the
(Continued)

strand insulating layer by crushing the internal voids. Therefore, the voids in the strand are crushed and flattened in the thickness direction of the strand insulating layer over the entire periphery.

12 Claims, 9 Drawing Sheets

(51) Int. Cl.
| | | |
|---|---|---|
| *H01B 3/30* | (2006.01) | |
| *H01B 7/29* | (2006.01) | |
| *H01F 27/28* | (2006.01) | |
| *H02K 3/12* | (2006.01) | |
| *H02K 3/34* | (2006.01) | |
| *H02K 15/10* | (2006.01) | |

(52) U.S. Cl.
CPC ............... *H01B 7/08* (2013.01); *H01B 7/292* (2013.01); *H01F 27/2823* (2013.01); *H02K 3/12* (2013.01); *H02K 3/34* (2013.01); *H02K 15/105* (2013.01)

(58) Field of Classification Search
USPC ... 174/110 R, 113 R, 120 R, 120 SR, 121 R, 174/121 SR
See application file for complete search history.

(56) References Cited

U.S. PATENT DOCUMENTS

| | | | |
|---|---|---|---|
| 2016/0189824 A1* | 6/2016 | Fukuda | ................. H01B 3/307 174/117 R |
| 2017/0004900 A1* | 1/2017 | Ishii | ....................... H01B 3/301 |
| 2017/0236618 A1* | 8/2017 | Fujimori | ................ H02K 11/33 174/110 SR |

FOREIGN PATENT DOCUMENTS

| | | |
|---|---|---|
| JP | 2007227266 A | 9/2007 |
| JP | 2013039000 A | 2/2013 |
| TW | M530461 U | 10/2016 |
| WO | WO-2011/138934 A1 | 11/2011 |
| WO | WO-2015/033821 A1 | 3/2015 |
| WO | WO-2015/137342 A1 | 9/2015 |

OTHER PUBLICATIONS

Office Action issued in Taiwan Patent Application No. 108102028 dated Sep. 20, 2019.
Office Action issued in Chinese Patent Application No. 20198002769.8 dated Oct. 22, 2020.

* cited by examiner

ASSEMBLED WIRE, METHOD OF MANUFACTURING ASSEMBLED WIRE AND SEGMENT COIL

TECHNICAL FIELD OF THE INVENTION

The present invention relates to an assembled wire that can be used for a segment coil in a motor, for example, and the like.

BACKGROUND OF THE INVENTION

In a stator of a motor used in a car, for example, enamel wires with circular cross sections have been conventionally used as winding wires. However, in recent years, to improve a space factor, use of flat winding wires having rectangular cross sections has been increasing. Also, a manufacturing method in which winding wires are wound around a core of a stator has been conventionally adopted in many cases. However, with adoption of the flat winding wires, a method of forming a coil by forming winding wires into segment coils of short length, installing the segment coils to a stator, and then connecting terminal portions of the segment coils with each other by welding have been increasingly adopted.

However, each flat winding wire has a large cross sectional area, and this leads to a problem that a winding loss may become larger due to eddy current generated when a frequency of the motor is increased due to increased rotational frequency of the motor.

To solve this, a separated conductor in which a plurality of conducting wires are unified has been proposed. That is, using separated conductors formed of a plurality of conducting wires as segment coils can suppress the influence of the eddy current.

A plurality of strands having insulation layers such as oxide films on their surfaces are bundled and unified to form the separated conductor having substantially a rectangular cross section, for example. With such a separated conductor, a fill factor of the conductor to a slot of the stator can be improved and, since the oxide film insulates each strand, an increase in an AC resistance due to a skin effect and the eddy current can be suppressed.

As such a separated conductor, for example, there is an assembled conductor formed by unifying a plurality of conducting wires, each of which includes a rectangular shaped conducting strand and a coating layer provided on outer periphery of the conducting strand (Japanese Unexamined Patent Application Publication No. 2007-227266 (JP-A-2007-227266)).

Also, there is a coil including assembled wires formed of a plurality of linear conductors and single wires, in which portions exposing from slots of a stator are formed of the single wires that are joined to each other in its longitudinal direction (Japanese Unexamined Patent Application Publication No. 2013-39000 (JP-A-2013-39000).

As described above, a plurality of strands insulated to each other are bundled to form the assembled wires. If the strands are electrically conductive to each other, the influence of the eddy current cannot be suppressed and effects of separating the conductor cannot be obtained. Thus, insulating layers that can insulate the strands from each other with certainty are required.

However, it is difficult to evenly coat a thin insulating layer on an outer periphery of a conductor. For example, a portion where its thickness is less than a predetermined thickness (a pinhole, for example) may partially occur due to the uneven thickness of the insulating layer. If there is a part to which a coating is not applied due to inequality of coating thickness, insulating performance is not fully exhibited and, as mentioned above, the influence of the eddy current cannot be suppressed and effects of separating the conductor cannot be obtained.

On the other hand, if the thickness of the insulating layer formed on a surface of each strand is increased, the influence of the unevenness of the thickness is reduced and the pinhole or the like are not likely to be generated. However, simply increasing the thickness of the insulating layer decreases the cross sectional areas of the conductor portion, which reduces the fill factor of the conductor to the slot of the stator.

SUMMARY OF THE INVENTION

The present invention was made in view of such problems. Its object is to provide an assembled wire that exhibits sufficient insulating performance and has a high fill factor of a conductor to a slot of a stator, and the like.

To achieve the above object, a first invention is an assembled wire in which a plurality of strands are assembled. The strand has a conductor portion and a strand insulating layer that coats the conductor portion. An outer insulating layer coats the plurality of the assembled strands, and the strand insulating layer has a void inside.

A ratio of the voids is preferably between 0.1% and 80%, and more preferably between 0.1% and 50%.

A thickness of the strand insulating layer is preferably 10 µm or less.

The outer insulating layer preferably includes a resin layer that has a melting point or a glass transition temperature of 250° C. or more.

The strand insulating layer is preferably a resin layer including a thermosetting resin as a principal component.

The strand has a flat square shaped cross section, and it is preferable that a plurality of the strands are stacked up with each other in layers in a thickness direction.

The number of the stacked layers of the strands is preferably between two and six.

The outer insulating layer preferably includes at least one type of thermosetting resin selected from a group of resin consisting of: polyarylehterketone, modified polyetheretherketone, thermoplastic polyimide, polyphenylene sulfide, polyethylene naphthalate, fluorine resin, and polyethylene terephthalate.

A modulus of elasticity of the strand insulating layer at 200° C. is preferably between 10 MPa and 2000 MPa.

The voids are preferably crushed and flattened in a thickness direction of the strand insulating layer over the entire periphery.

According to the first invention, there are voids formed inside the wire-element insulating layer, and thus the strand insulating layer can be collapsed and deformed easily. For this reason, the manufacture can be done easily by forming the thick strand insulating layer. Also, when the strands are bundled, the strand insulating layer crushes to be thinner so the high fill factor to the slot can be obtained. Also, the strand insulating layer includes voids inside, and thus it is easy to be detached from the conductor portion. Accordingly, operations such as detaching the strand insulating layer of a welded portion are easy.

In particular, if the ratio of the voids is 0.1% or more, the voids still remain after collapsing. This means that there is still a little margin for the strand insulating layer to be collapsed and thus the strand insulating layer is never completely collapsed with excessive compression force. Also, if the ratio of the voids is 80% or less, the voids remain excessively, which suppresses deformation of the strand insulating layer when being used. If the ratio of the voids is 50% or less, the deformation of the strand insulating layer when being used can be suppressed furthermore.

Also, since the strand insulating layer is collapsed, the places where coating is not applied due to uneven coating thickness are hardly formed even if the thickness of the strand insulating layer is extremely thin. Thus, it is possible to make the thickness of the strand insulating layer 10 μm or less. As a result, the high space factor of the conductor can be obtained.

Also, the outer insulating layer includes a resin having a melting point or a glass transition temperature of 250° C. or higher so a high heat resistance can be obtained. In this case, the outer insulating layer can be selected from the group of resin consisting of polyarylehterketone, modified polyetheretherketone, thermoplastic polyimide, polyphenylene sulfide, polyethylene naphthalate, fluorine resin, and polyethylene terephthalate.

Also, if the strand insulating layer is a resin layer including a thermosetting resin as a principal component, a hardness of the strand insulating layer is maintained to a certain degree at the time of coating the outer insulating layer, for example, and thus the more stable strand insulating layer can be obtained. For example, if the strand insulating layer is made of a thermoplastic resin, its hardness plunges beyond the softening temperature and thus the strand insulating layer may be collapsed excessively. Forming the strand insulating layer from a thermosetting resin as above can make the entire strand insulating layer evenly collapsed to have a thin thickness. Also, using a thermosetting resin reduces deformation or the like in use and improves the heat resistance.

Also, making the cross section of the strand a flat-square shape can improve its fill factor to the slot, and stacking the plurality of the strands with each other in the thickness direction thereof prevents shifting between the strands when the assembled wire is bent.

In this case, the function of the separated conductor can be fully exhibited with two or more stacked layers of the strands, and six or less layers facilitate bending process and the like.

If the modulus of elasticity of the strand insulating layer at 200° C. is between 10 MPa and 2000 MPa, the strand insulating layer can be moderately collapsed when coating the outer insulating layer. Thus, the strand insulating layer can be collapsed substantially uniformly over the entire periphery thereof. That is, the voids inside the strand insulating layer can be collapsed and flattened in its thickness direction over the entire periphery thereof.

A second invention is a method for manufacturing an assembled wire. The method includes a step of coating a conductor portion with a resin and foaming the resin so as to obtain a strand in which the conductor portion is coated with a strand insulating layer, and a step of assembling a plurality of the strands, coating an outer insulating layer on an outer periphery portion of the strands, and collapsing the strand insulating layer.

According to the second invention, an assembled wire that excels in insulating property and has a high fill factor to the slot can be efficiently obtained.

A third invention is a segment coil using the assembled wire according to the first invention.

According to the third invention, a reliable segment coil can be obtained.

The present invention can provide an assembled wire that exhibits sufficient insulating performance and has a high fill factor of a conductor to a slot of a stator, and the like

BRIEF DESCRIPTION OF DRAWINGS

FIG. 8A is a cross sectional view showing a separated conductor 5a.

DESCRIPTION OF SOME EMBODIMENTS

Figure 1:
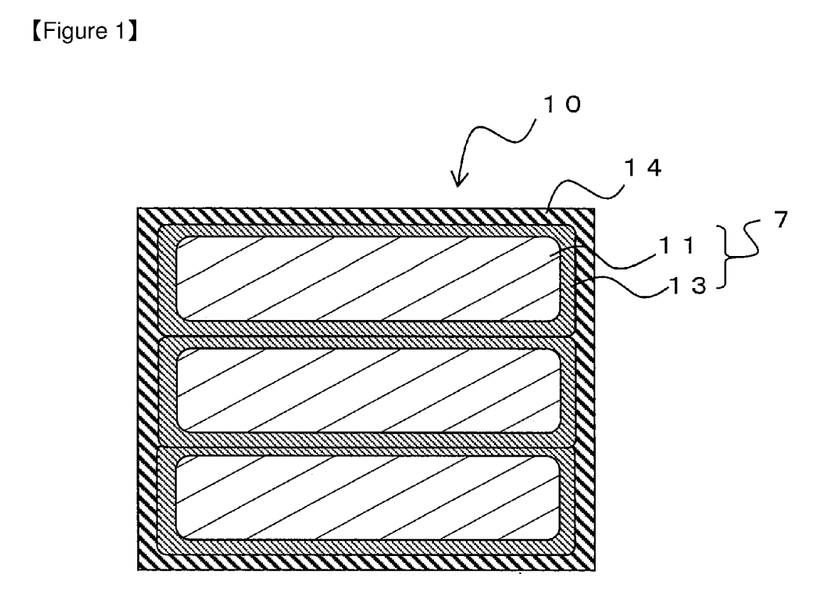
FIG. 1 is a cross sectional view showing an assembled wire 10.

Hereinafter, some embodiments of the present invention will be described with reference to the accompanying drawings. FIG. 1 is a cross sectional view showing an assembled wire 10. The assembled wire 10 has a substantially rectangular shaped cross section and is formed by assembling a plurality of strands 7. In the illustrated example, each strand 7 has a flat-square shaped cross section and the plurality of the strands 7 are stacked with each other in a thickness direction of the strand 7 to be disposed. Stacking up in this way improves bending property of the assembled wire 10.

The number of layers of the strand 7 is preferably between two and six. If there is only one layer of the strand 7, an effect of separating a conductor portion cannot be obtained. If the number of layers is over seven, the thickness is too large and the bending process or the like becomes difficult. The shape, the number, and the arrangement of the strand 7 are not limited to the illustrated example.

Each strand 7 includes a conductor portion 11 and a strand insulating layer 13 that covers the conductor portion 11. The conductor portion 11 is made of copper or copper alloy, for example. For the strand insulating layer 13, although a thermoplastic resin such as polyethylene terephthalate may be applicable, a resin layer including a thermosetting resin as a principal component is preferable. In such a case, for example, polyimide, polyamide imide, or the like are applicable.

A thickness of the strand insulating layer 13 is preferably 10 μm or less. If the thickness of the strand insulating layer 13 is too large, a space factor of the conductor portion 11 is impaired. Also, to ensure an insulating performance of the strand insulating layer 13, the thickness thereof is preferably 0.1 μm or more. The strand insulating layer 13 will be described in detail below.

At least a part of the assembled plurality of the strands 7 in the longitudinal direction is covered with an outer insulating layer 14 directly or indirectly via another insulating layer. The outer insulating layer 14 includes a resin having a melting point or a glass transition temperature of 250° C. or higher, and it is preferable that the outer insulating layer 14 includes at least one type of thermoplastic resin selected from the group of resin consisting of polyarylehterketone, modified polyetheretherketone, thermoplastic polyimide, polyphenylene sulfide (PPS), polyethylene naphthalate (PEN), fluorine resin, and polyethylene terephthalate (PET).

Figure 2A:
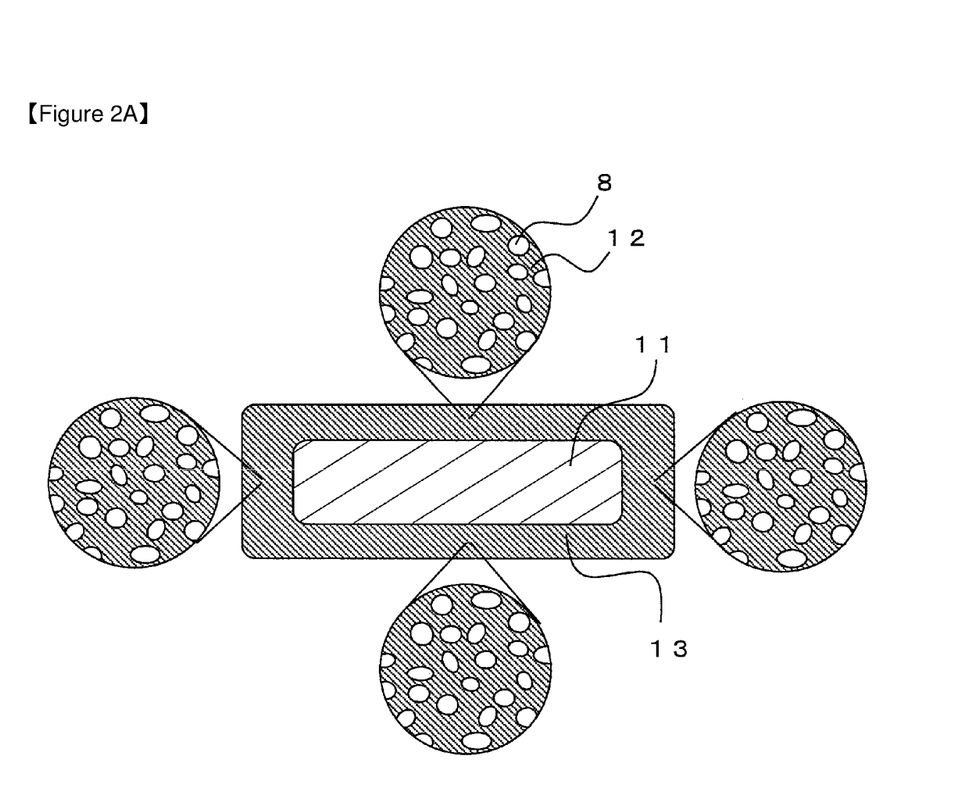
FIG. 2A is a partially enlarged view of a strand 7 before becoming the assembled wire 10.
Figure 2B:
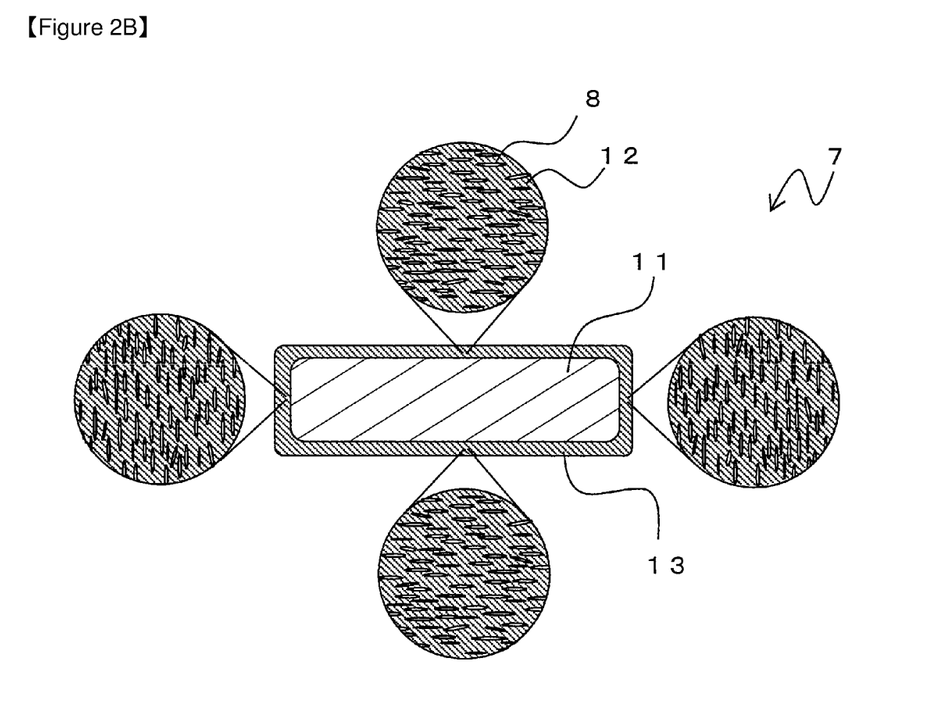
FIG. 2B is a partially enlarged view of the strand 7 after becoming the assembled wire 10.

Next, the strand insulating layer 13 will be described in detail. FIG. 2A is a cross sectional view of the strand 7 before becoming the assembled wire 10, and FIG. 2B is a cross sectional view of the strand 7 after becoming the assembled wire 10. The strand 7 is formed as below. First, a resin 12, which will form the strand insulating layer 13, is coated on an outer periphery of the conductor portion 11. Next, as shown in FIG. 2A, the resin 12 is foamed to form the strand insulating layer 13, and the strand 7, in which the conductor portion 11 is covered with the strand insulating layer 13, is obtained. That is, the strand insulating layer 13 is made of a foamed resin and there are many voids 8 formed inside the strand insulating layer 13.

From this state, the strand insulating layer 13 is heated and pressurized, for example, to be collapsed so that the strand 7 is formed. At this time, the voids 8 inside are crushed so that the strand insulating layer 13 can be uniformly collapsed. As a result, the voids 8 in the strand 7 are crushed and flattened in the thickness direction of the strand insulating layer 13 over the entire periphery.

Applying a thick coat of the resin 12 having voids 8 on the outer periphery of the conductor portion 11 in this way prevents generating places where coating is not applied due to uneven coating thickness. Also, compared to a thin coating, coating can be applied with a relatively uniform thickness. Also, collapsing the strand insulating layer 13 to be thin after the coating can improve the space factor.

Figure 3A:
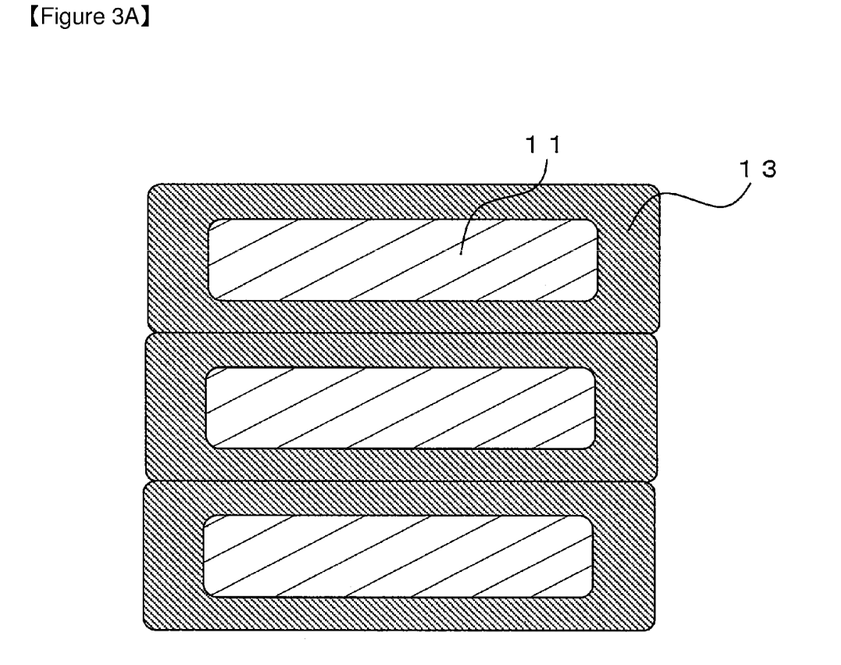
FIG. 3A is a view showing a state in which the strands 7 are bundled before compression.
Figure 3B:
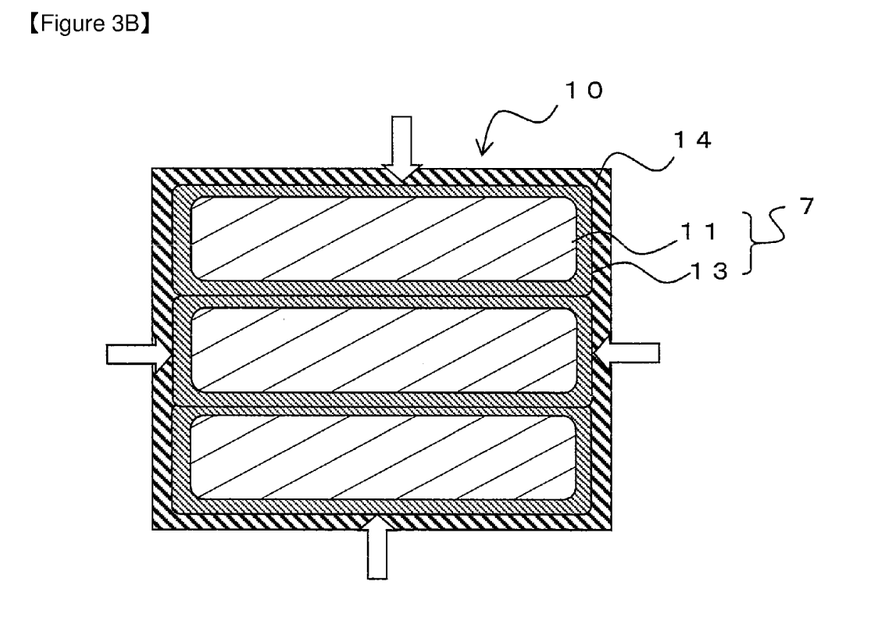
FIG. 3B is a view showing a state in which an outer insulating layer 14 is coated.

FIG. 3A and FIG. 3B are views illustrating an example of a method for manufacturing the assembled wire 10. First, as mentioned above, the conductor portion 11 is covered by a resin that is then foamed to obtain the strand 7, in which the strand insulating layer covers the conductor portion 11. Next, as shown in FIG. 3A, the plurality of the strands 7 are assembled and bundled together. Then, the resin-made outer insulating layer 14 is coated by extrusion or the like on the outer periphery of the bundle of the strands that are disposed as above. At this time, the strand insulating layer 13 is collapsed to make the assembled wire 10. Accordingly, the assembled wire 10 shown in FIG. 1 can be formed.

If the strand insulating layer 13 is collapsed while extruding the outer insulating layer 14, it is preferable that the modulus of elasticity of the resin 12 of the strand insulating layer 13 at 200° C. is between 10 MPa and 2000 MPa. If the modulus of elasticity of the strand insulating layer 13 is too low, the resin is crushed excessively, which makes it difficult to obtain the sufficient thickness of the strand insulating layer 13. Also, if the modulus of elasticity of the strand insulating layer 13 is too high, the resin is not crushed, which makes it difficult to decrease the thickness of the strand insulating layer 13.

Alternatively, instead of during the extrusion of the outer insulating layer 14, the strand insulating layer 13 may be collapsed during a process provided separately for heating and pressurizing the outer periphery part of the strand insulating layer 13. The strands 7 having the strand insulating layer 13 that are collapsed in the thickness direction in this way may be assembled together and then the outer insulating layer 14 may coat the assembled strands 7 by extrusion.

Also, a volume ratio of the voids 8 inside the strand insulating layer 13 after being collapsed is preferably between 0.1% and 80%. If the volume ratio of the voids 8 is 0.1% or more, the voids remain after collapsing. This means that there is still a little margin for the strand insulating layer 13 to be collapsed and thus the strand insulating layer 13 is never completely collapsed with excessive compression force. Also, if the volume ratio of the voids is 80% or less, the voids remain excessively, which suppresses deformation of the strand insulating layer 13 when being used. If the volume ratio of the voids 8 is 50% or less, the deformation of the strand insulating layer 13 when being used can be suppressed furthermore. On the other hand, if the volume ratio of the voids 8 is over 80%, a defect in the strand insulating layer is likely to occur during the bending process. This results in an insufficient insulating performance, and thus the influence of eddy current cannot be suppressed. The volume ratio of the voids 8 can be calculated from an area ratio of the voids 8 that can be found by obtaining a several enlarged images of cross sections, which are taken in a direction perpendicular to a longitudinal direction of the assembled wire 10, of the strand insulating layer 13.

Figure 4:
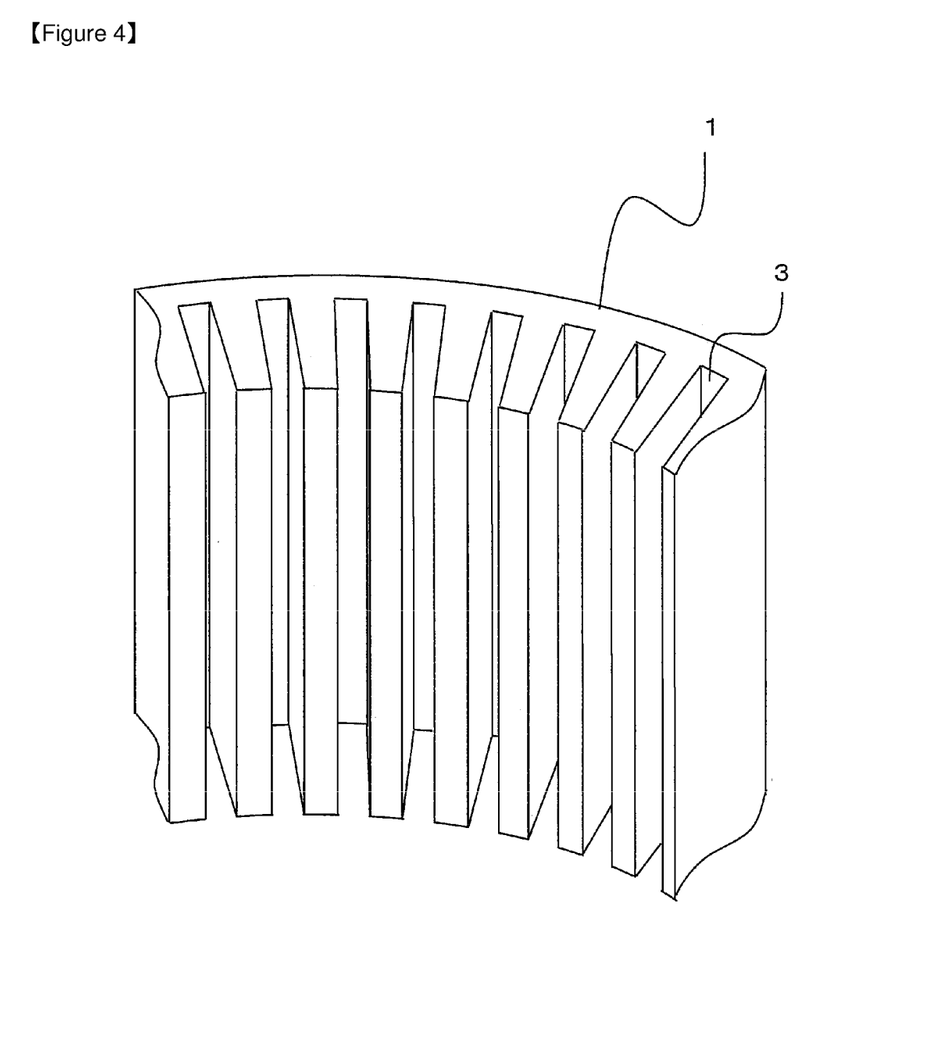
FIG. 4 is a partial perspective view showing a stator core 1.

Next, a segment coil in which the assembled wire 10 is used will be described. The segment coil is used in, for example, a car motor. FIG. 4 is a partial perspective view showing a stator core 1 used in a motor. The stator core 1 is in a substantially cylindrical shape and is formed by laminating electromagnetic steel sheets, for example. On an inner periphery side of the stator core 1, a plurality of slots 3 are provided. A conductor is disposed in each slot 3 and joining the conductors with each other forms a coil.

Figure 5:
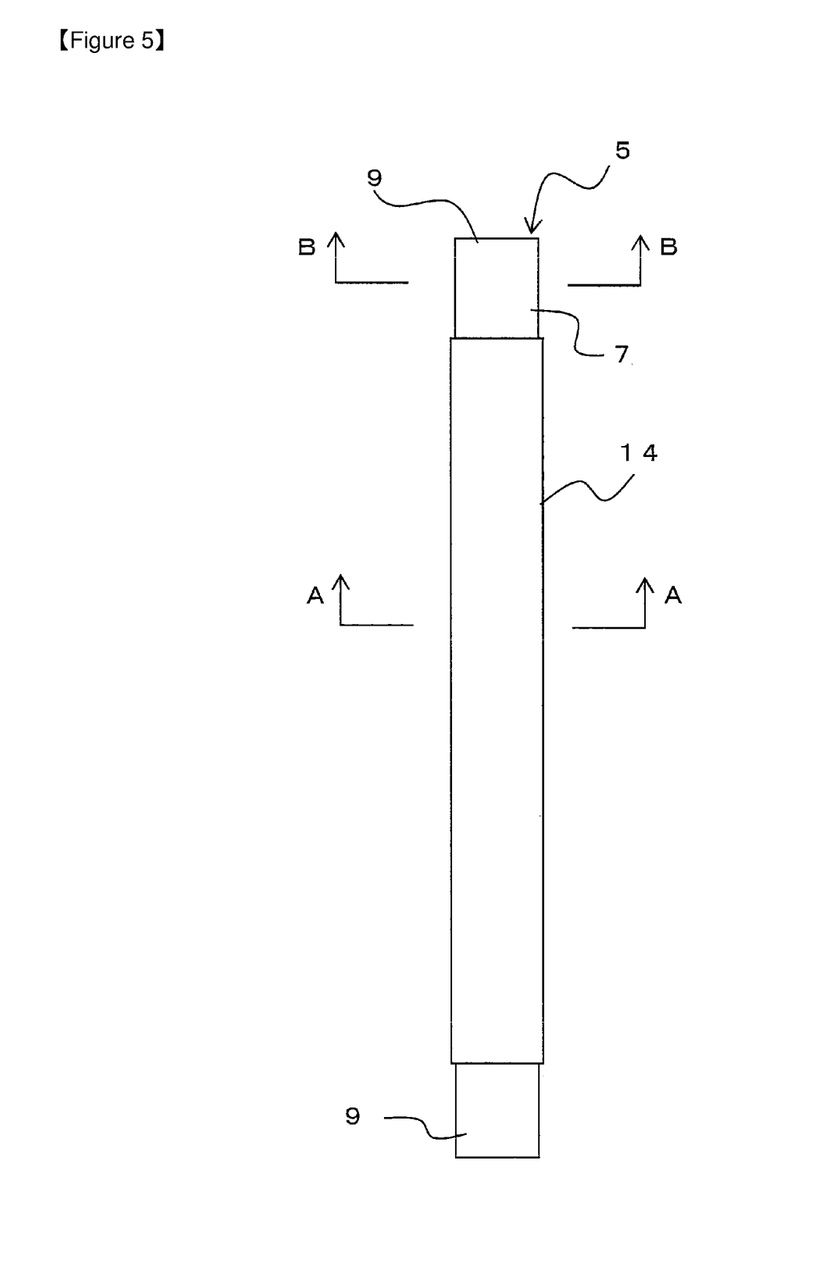
FIG. 5 is a plan view showing a separated conductor 5.
Figure 6A:
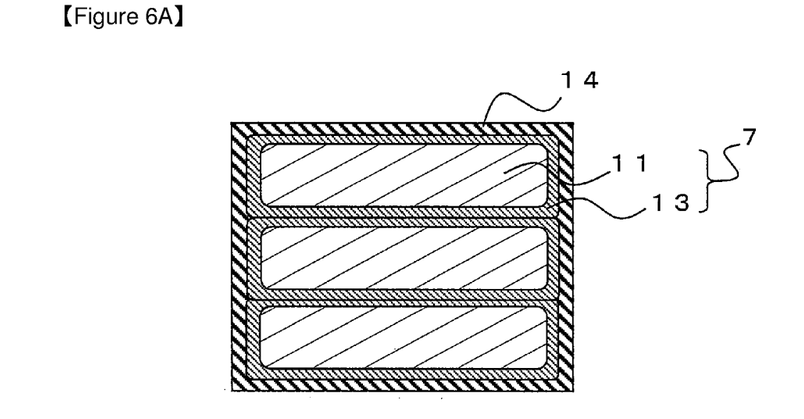
FIG. 6A is a cross sectional view of the separated conductor 5, taken along A-A line in FIG. 5.
Figure 6B:
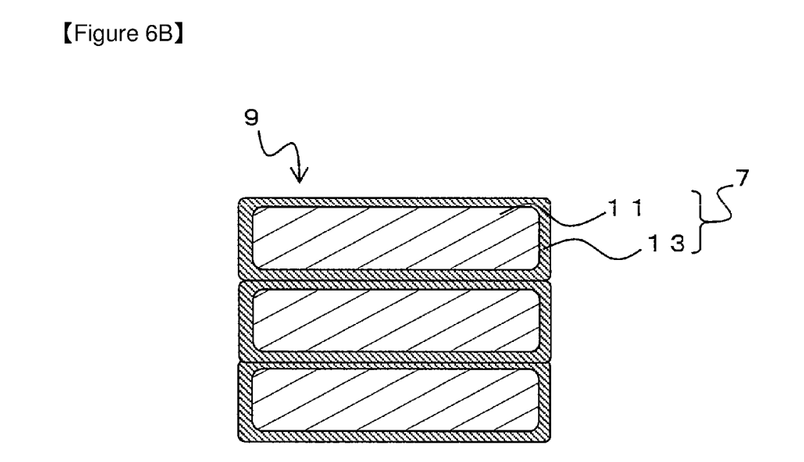
FIG. 6B is a cross sectional view of the separated conductor 5, taken along B-B line in FIG. 5.

FIG. 5 is a plan view of a separated conductor 5 for the segment coil that is to be disposed in the slot 3. FIG. 6A is a cross sectional view taken along A-A line in FIG. 5, and FIG. 6B is a cross sectional view taken along B-B line in FIG. 5. The separated conductor 5 is formed by cutting the assembled wire 10 into short lengths. That is, the separated conductor 5 includes at least the plurality of the strands 7. Each of the strands 7 is unified in its longitudinal direction, and thus the separated conductor 5 is formed as one body in its longitudinal direction without joint portions that connect between the conductor portions.

As shown in FIG. 6B, the outer insulating layer 14 is removed at both end portions 9 of the separated conductor 5. That is, on at least both end portions of the assembled wire 10, the outer insulating layer 14 is not formed and the strand 7 is exposed. The outer insulating layer 14 is removed by a mechanical method such as polishing, or a chemical method such as etching. The separated conductor 5 is then bent into a required shape to be used. In the embodiments hereinafter, examples in which the outer insulating layer 14 at the end portions 9 is removed will be illustrated. However, the outer insulating layer 14 may be formed up to the end portions 9.

Figure 7:
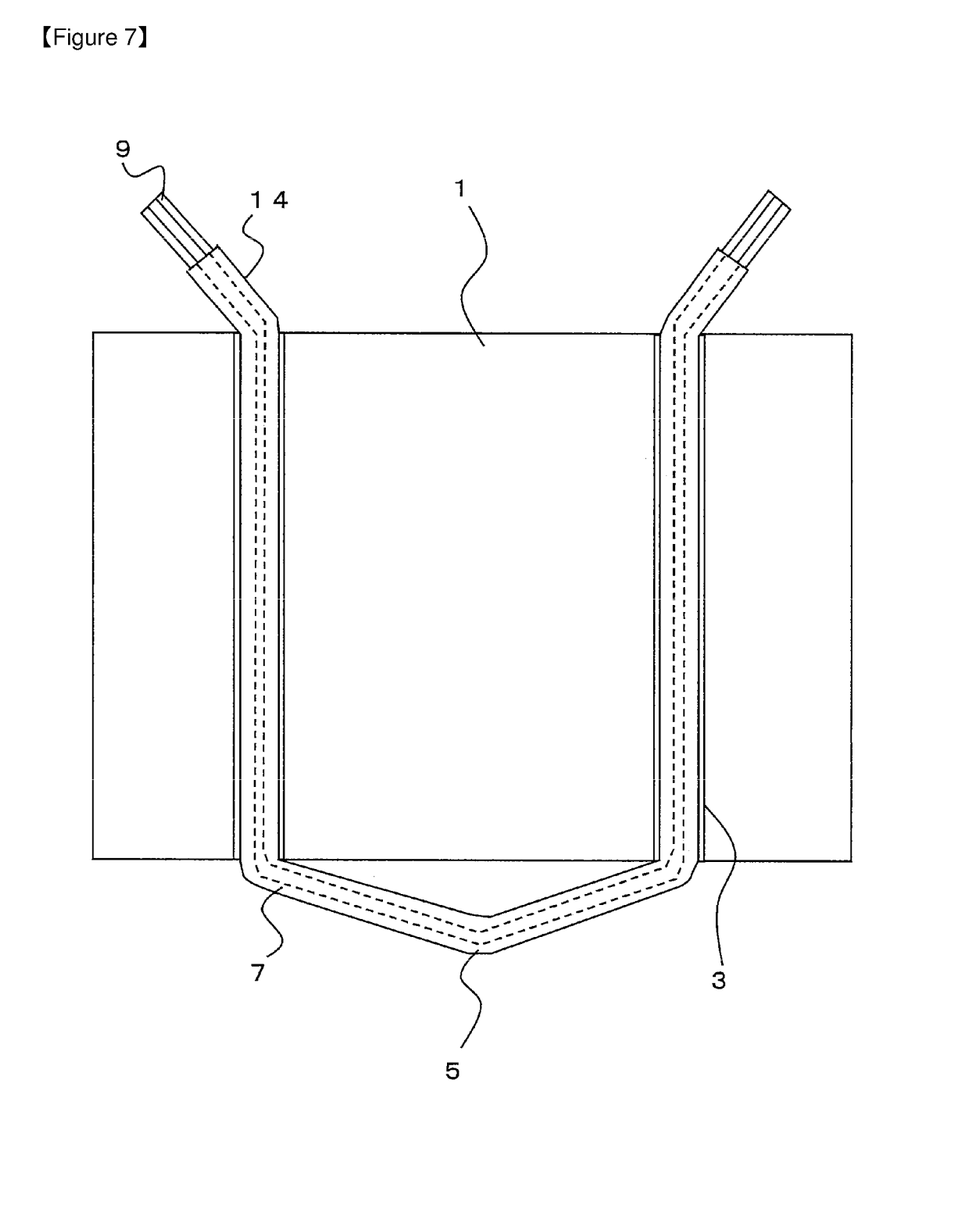
FIG. 7 is a schematic view showing a state in which the separated conductor 5 is disposed in slots 3.

FIG. 7 is a schematic view showing a sate in which the separated conductor 5 is disposed in the slots 3 when viewed from an inner surface side of the stator core 1. The drawing shows only a part of the stator core 1. As mentioned above, the separated conductor 5 is bent into a predetermined shape and disposed into the slots 3. At this time, the end portions 9 of the separated conductor 5 protrude from an upper part of the stator core 1 and a bent portion of the separated conductor 5 is exposed from a lower part of the stator core 1.

The end portion 9 of the separated conductor 5 protruding above the stator core 1 is joined with the end portion 9 of the other adjacent separated conductor 5 (not illustrated) by welding. Connecting all the separated conductors 5 to each other forms a coil.

In the example shown in FIG. 6B, only the outer insulating layer 14 is removed at the end portions 9, and the strand 7 includes the conductor portion 11 and the strand insulating layer 13. However, the strand insulating layer 13 may also be further removed. Removing also the strand insulating layer 13 can suppress soot and the like generated from the resin 12 at the time of welding. At this time, the strand insulating layer 13 includes the voids 8 so it is easy to peel off the resin 12 from the conductor portion 11.

According to the present embodiment, the voids 8 are provided inside the strand insulating layer 13, which are collapsed after being formed. Thus, when the resin 12 is applied, it is unnecessary to apply the resin thinly and uniformly. This prevents generating of places where coating is not applied due to uneven coating thickness, so the strand insulating layer 13 can be formed with a uniform thickness. Also, by collapsing the strand insulating layer 13 before or at the same time of the coating with the outer insulating layer 14, the thickness of the strand insulating layer 13 can be reduced, which improves the space factor.

In particular, the places where coating is not applied due to uneven coating thickness are not formed even when the thickness of the strand insulating layer 13 is 10 μm or less. This ensures to obtain the insulating performance with certainty and highly enhances the space factor.

Also, if the strand insulating layer 13 is made of a thermosetting resin, there is no plunge in the hardness at the time of heating compared to a case with a thermo-plastic resin. This can prevent the strand insulating layer 13 from collapsed excessively when the strand insulating layer 13 is collapsed.

Also, if the outer insulating layer 14 is made of a resin having a melting point or a glass transition temperature of 250° C. or higher, then a high heat resistance can be obtained.

Working Examples

Next, a plurality of types of separated conductors with different strand insulating layers and the like are made and evaluated in high frequency performance, processability, and heat aging resistance. Working examples 1 to 11 according to the present invention are shown in Table 1 and Table 2. Also, comparison examples 1 to 4 are shown in Table 3.

TABLE 1

| | | Working Example 1 | Working Example 2 | Working Example 3 | Working Example 4 | Working Example 5 | Working Example 6 |
|---|---|---|---|---|---|---|---|
| Metal Conductor | Type | Cu | Cu | Cu | Cu | Cu | Cu |
| | Assembling Method | Stacked Layer | Stacked Layer | Stacked Layer | Separation A | Stacked Layer | Stacked Layer |
| | Number of Separation | 2 | 2 | 6 | 7 | 2 | 6 |
| Type of strand insulating layer | Resin | PAI | PI | PEI | PAI | PET | PI |
| | Coating Thickness (um) | 3.0 | 4.0 | 2.5 | 2.5 | 4.0 | 2.5 |
| | Cavity Ratio (Volume %) | 30 | 30 | 45 | 30 | 35 | 55 |
| Type of outer insulating layer | Resin | PEEK | PPS | PEEK | Thermo-plastic PI | PPS | PEEK |
| | Coating Thickness (um) | 100 | 80 | 150 | 80 | 40 | 120 |
| | High Frequency PerFormance | B | B | A | A | B | A |
| | Space Factor | 99.1 | 98.8 | 98.0 | 98.0 | 98.9 | 98.0 |
| | Processability | B | B | B | C | B | B |
| | Heat Aging Resistance | A | A | A | A | B | A |

TABLE 2

| | | Working Example 7 | Working Example 8 | Working Example 9 | Working Example 10 | Working Example 11 |
|---|---|---|---|---|---|---|
| Metal Conductor | Type | Cu | Cu | Cu | Cu | Cu |
| | Assembling Method | Separation B | Stacked Layer | Stacked Layer | Stacked Layer | Stacked Layer |
| | Number of Separation | 2 | 2 | 2 | 6 | 10 |
| Type of strand insulating layer | Resin | PAI | PAI | PI | PEI | PAI |
| | Coating Thickness (um) | 7.0 | 3.0 | 12.2 | 2.5 | 2.5 |
| | Cavity Ratio (Volume %) | 35 | 50 | 5 | 70 | 30 |

TABLE 2-continued

|  |  | Working Example 7 | Working Example 8 | Working Example 9 | Working Example 10 | Working Example 11 |
|---|---|---|---|---|---|---|
| Type of outer insulating layer | Resin | PFA | PEEK | PPS | PEEK | Thermoplastic PI |
|  | Coating Thickness (um) | 50 | 40 | 80 | 150 | 80 |
| High Frequency Performance |  | B | B | B | A | A |
| Space Factor |  | 98.0 | 99.1 | 96.5 | 98.1 | 96.1 |
| Processability |  | B | B | B | B | C |
| Heat Aging Resistance |  | A | A | A | A | A |

TABLE 3

|  |  | Comparison Example 1 | Comparison Example 2 | Comparison Example 3 | Comparison Example 4 |
|---|---|---|---|---|---|
| Metal Conductor | Type | Cu | Cu | Cu | Cu |
|  | Assembling Method | Stacked Layer | Stacked Layer | Separation | Stacked Layer |
|  | Number of Separation | 2 | 1 | 2 | 2 |
| Type of strand insulating layer | Resin | PAI | PAI | PAI | PAI |
|  | Coating Thickness (um) | 3.0 | 2.1 | 7.0 | 3.0 |
|  | Cavity Ratio (Volume %) | 0 | 30 | 35 | 50 |
| Type of outer insulating layer | Resin | PEEK | PEEK | PBT | PES |
|  | Coating Thickness (um) | 100 | 100 | 50 | 40 |
| High Frequency Performance |  | D | D | B | B |
| Space Factor |  | 99.1 | 99.3 | 98.0 | 99.1 |
| Processability |  | B | B | B | B |
| Heat Aging Resistance |  | A | A | C | C |

As the strand insulating layer, polyamideimide (PAI), polyimide (PI), polyetherimide (PEI), and polyethylene terephthalate (PET) are used. Also, as the outer insulating layer, polyether etherketone (PEEK), polyphenylene sulfied (PPS), thermoplastic polyimide, and a fluoride resin (PFA) are used.

Figure 8A:
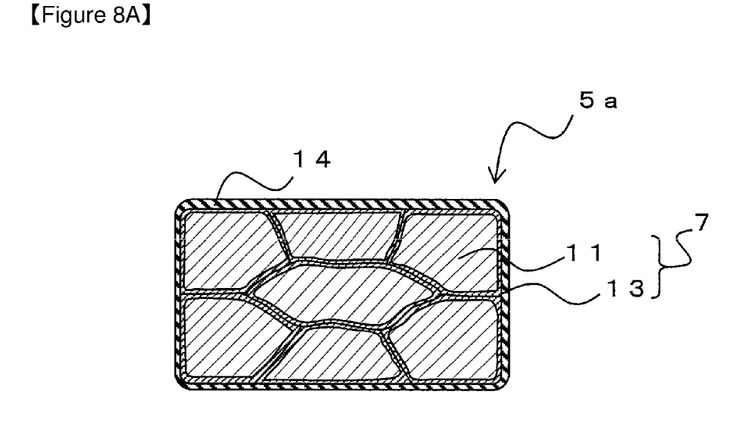
Figure 8B:
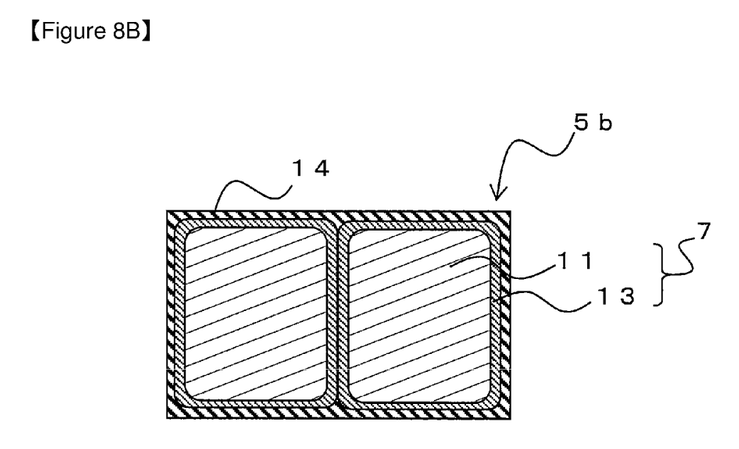
FIG. 8B is a cross sectional view showing a separated conductor 5b.

For the assembling method in the tables, 'Stacked Layer' represents the flat-square strands that are stacked in the thickness direction of the assembled wire. Also, 'Separation A' has a cross sectional shape as in the separated conductor 5a shown in FIG. 8A. This is formed by disposing total of seven strands, one of which is disposed at the center of a circular shaped strand and six others are disposed around its outer periphery in a close packed arrangement, which is then molded in a metal mold to be shaped into a flat square shape, and coating the outer insulating layer 14, for example. Also, 'Separation B' has a cross sectional shape as in the separated conductor 5b shown in FIG. 8B. That is, the flat square shaped strands 7 are stacked in the thickness direction so that the stacking direction corresponds to a width direction of the assembled wire. The number of separation is the number of the strands 7.

The high frequency performance in the tables is evaluated by operating an alternating current magnetic field generator under conditions of 1000 Hz, 2.16 A, and 138 Vrms to generate an alternating current magnetic field of 50 mT. When a test piece is placed inside the magnetic filed, heat is generated due to eddy current. A calorific value of this generated heat is measured as a current loss (W). An amount of current loss W0 of a conductor that is made of a layer-less conductor with an extrusion coated strand insulating layer is calculated as above. When a ratio of the amount of current loss W to W0 of each piece is 0.8 or less (a suppression ratio of the amount of loss is 20% or more), the high frequency performance is evaluated as good and graded as 'B'. Furthermore, if the above ratio is 0.4 or less (the suppression ratio of the amount of loss is 60% or more), the high frequency performance is evaluated as excellent and graded as 'A'. On the other hand, if the above ratio is 0.8 or more (the suppression ratio of the amount of loss is less than 20%), the high frequency performance is evaluated as inferior and graded as 'D'.

The processability in the tables determines whether the strands are stacked without tilting or shifting. This is done by cutting the assembled wire and observing its cross section. As for the tilting, it is checked that there is no angle formed against the stacking direction of the strand. As for the shifting, if the strands are stacked in the thickness direction, it is checked that there is no shifting over third of a width of the strand between not only the adjacent conductors but also between the conductors that are shifted most. If such tilting and shifting is less than third of the width of the strand, it is judged as within an allowable range and graded as 'A', 'B', or 'C'. If there is a tilting or shifting as mentioned above, it is judged as inferior and graded as 'D'.

More specifically, in a case in which flat-square shaped strands are stacked in the thickness direction, if the maximum shifting in the width direction between the strands is less than tenth of the width of the strand, it is judged as excellent and graded as 'A'; if the maximum shifting in the width direction between the strands is tenth or more and less than fifth of the width of the strand, it is judged as good and graded as 'B'; if the maximum shifting in the width direction between the strands is fifth or more and less than third of the width of the strand, it is judged as within the allowable range and graded as 'C'; and if the maximum shifting in the width direction between the strands is third of the width of the strand or more, it is judged as inferior and graded as 'D'.

Also, for the heat aging resistance in the tables, an assembled wire in a straight shape is prepared and then heated and processed under a constant temperature of 200° C. If no cracks can be seen on the surface of the assembled wire after being heated for 500 hours, the heat aging resistance is judged as excellent and graded as 'A'. Also, if the assembled wire is heated and processed under the constant temperature of 200° C. and there are cracks on the surface of the assembled wire after being heated for 500 hours, but no cracks can be seen on the surface of the assembled wire after being heated for 250 hours, the heat aging resistance is judged as good and graded as 'B'. Also, if the assembled wire is heated and processed under the constant temperature of 200° C. and there are cracks on the surface of the assembled wire after being heated for 250 hours, but no cracks can be seen on the surface of the assembled wire after being heated for 100 hours, the heat aging resistance is judged as inferior and graded as 'C'.

From the results, all Working Examples 1 to 11 that include the strand insulating layer with voids make the passing mark by being graded B or higher in the high frequency performance, C or higher in the processability, and B or higher in the aging resistance. Also, all the space factors of Working Examples 1 to 11 are 96% or higher.

Working Examples 3, 4, 6, 10, and 11 having three or more number of separation are graded 'A' in the high frequency performance and are especially good. However, Working Examples 4 and 11 having the number of separation exceeding six tend to have a large shifting and the processability thereof is graded as 'C'. Also, the heat aging resistance of Working Examples 1 to 4 and 6 to 11, which include the strand insulating layers made of thermosetting resin, is graded as 'A'.

On the other hand, the high frequency performance of Comparison Example 1 is graded as D'. This is because there are no voids provided and it is necessary to form a thin strand insulating layer from the start, and thus pin holes or the like are generated. Also, since the number of separation in Comparison Example 2 is one, the high frequency performance thereof is graded as D'. Also, since the softening temperature of the outer insulating layer of Comparison Examples 3 and 4 is lower than 250° C. and thus the heat resistance thereof is low, the heat aging resistance thereof is graded as 'C'.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. An assembled wire comprising:
   a plurality of strands, each of the plurality of strands comprising:
      a conductor portion; and
      a strand insulating layer that coats the conductor portion, the strand insulating layer comprising a plurality of internal voids; and
   an outer insulating layer coating the plurality of strands, wherein the voids are crushed and flattened in a thickness direction of the strand insulating layer over an entire periphery.

2. The assembled wire according to claim 1, wherein a ratio of the voids is between 0.1% and 80%.

3. The assembled wire according to claim 1, wherein a ratio of the voids is between 0.1% and 50%.

4. The assembled wire according to claim 1, wherein a thickness of the strand insulating layer is 10 µm or less.

5. The assembled wire according to claim 1, wherein the outer insulating layer includes a resin that has a melting point or a glass transition temperature of 250° C. or more.

6. The assembled wire according to claim 1, wherein the strand insulating layer is a resin layer including a thermosetting resin as a principal component.

7. The assembled wire according to claim 1, wherein the strand has a flat square shaped cross section, and the plurality of the strands are stacked up with each other in layers in a thickness direction.

8. The assembled wire according to claim 7, wherein the number of the stacked layers of the strand is between two and six.

9. The assembled wire according to claim 1, wherein the outer insulating layer includes at least one type of thermosetting resin selected from a group of resin consisting of: polyarylehterketone, modified polyetheretherketone, thermoplastic polyimide, polyphenylene sulfide, polyethylene naphthalate, fluorine resin, and polyethylene terephthalate.

10. The assembled wire according to claim 1, wherein a modulus of elasticity of the strand insulating layer at 200° C. is between 10 MPa and 2000 MPa.

11. A method for manufacturing an assembled wire, the method comprising:
   a step of coating a conductor portion with a resin and foaming the resin so as to obtain a strand in which the conductor portion is coated with a strand insulating layer; and
   a step of assembling a plurality of the strands, coating an outer insulating layer on an outer periphery portion of the assembled plurality of strands, and collapsing the strand insulating layer in a thickness direction of the strand insulating layer over an entire periphery.

12. A segment coil using the assembled wire according to claim 1.

* * * * *